United States Patent [19]
Tanaka et al.

[11] Patent Number: 4,781,446
[45] Date of Patent: Nov. 1, 1988

[54] ZOOM LENS HAVING A CAPABILITY OF INTRODUCING SPECIAL FEATURES INTO IMAGE FORMATS

[75] Inventors: Tsunefumi Tanaka; Takashi Matsushita, both of Kanagawa; Nozomu Kitagishi; Sadatoshi Takahashi, both of Tokyo; Keiji Ikemori, Kanagawa, all of Japan

[73] Assignee: Canon Kabushiki Kaisha, Tokyo, Japan

[21] Appl. No.: 798,756

[22] Filed: Nov. 15, 1985

[30] Foreign Application Priority Data

Nov. 16, 1984 [JP] Japan .................................. 59-242150
Nov. 16, 1984 [JP] Japan .................................. 59-242151

[51] Int. Cl.$^4$ .................... G02B 15/14; G02B 15/177; G02B 13/18
[52] U.S. Cl. .................................. 350/426; 350/423; 350/431
[58] Field of Search ..................... 350/423, 426, 431

[56] References Cited

U.S. PATENT DOCUMENTS 4,124,276 11/1978 Okano et al. .................... 350/431

FOREIGN PATENT DOCUMENTS

0124116 9/1980 Japan .................................. 350/431

Primary Examiner—John K. Corbin
Assistant Examiner—Ronald M. Kachmarik
Attorney, Agent, or Firm—Fitzpatrick, Cella, Harper & Scinto

[57] ABSTRACT

A zoom lens having a plurality of lens units with the air separations, at least one of which is varied to effect zooming, the rearmost lens surface of successive two of the lens units and the frontmost lens surface of the rear one being both formed to convex shapes toward the front, whereby when these two lens units axially move at different speeds from each other, a soft-focus effect of varying magnitude is produced on the image.

11 Claims, 10 Drawing Sheets

FIG.15

ZOOM LENS HAVING A CAPABILITY OF INTRODUCING SPECIAL FEATURES INTO IMAGE FORMATS

BACKGROUND OF THE INVENTION

1. Field of the Invention

This invention relates to zoom lenses having soft-focus functions, and, more particularly, to zoom lenses having soft-focus functions with a simple management of moving lens units which constitute part of the zooming section making it possible to introduce aberration into the photographic image while permitting easy control of the variation of the amount of aberration.

2. Description of the Related Art

The prior known methods of softening the photographic image are to attach a soft-focus filter in front of the lens, or to change the axial position of an optical element in the lens system as proposed in Japanese Patent Publication No. SHO 58-1402, or to add an attachment lens as proposed in Japanese Utility Model Publication No. SHO 57-9769. These methods are, however, hardly able to defocus the image uniformly over the entire area of the image format. Another disadvantage of the prior art is the troublesome management in varying the magnitude of the soft-focus effect, because, for example, a series of soft-focus filters have to be interchanged with one another.

In British Patent No. 234,743, Japanese Laid-Open Patent Applications No. SHO 52-76921 and No. SHO 55-52013 (U.S. Pat No. 4,310,221), for mono-focal length lens systems, there has been proposed a method of continuously varying the amount of introduced aberration, for example, spherical aberration, by making variable one of the air separations in the optical system. However, these lens systems are designed for adaptation to special photography and do not work well in photographic situations which may be generally encountered.

SUMMARY OF THE INVENTION

A general object of the present invention is to provide a possbility of making a lens system capable, upon operation of an actuator, of zooming able to project an image format having desirable special features formed by using that actuator.

A concomitant object is to provide a method of designing such a lens system in order to insure that a soft-focusing of the image is effected in uniform all over its field.

For this purpose, rules of design are set forth so that the amount of spherical aberration introducible into the image format can be varied without causing deterioration of the other aberrations.

DETAILED DESCRIPTION OF THE PREFERRED EMBODIMENTS

FIG. 6 to FIG. 9 depict the lens configurations of embodiments of the present invention along with the expanded loci of zooming and soft-focusing motions.

These zoom lenses each have at least two lens units, or, from front to rear, lens units A and B, wherein during zooming, at least the aforesaid two lens units A and B move axially, whereby the rearmost lens surface R1r of the unit A and the frontmost lens surface R2f of the unit B both are made convex toward the front, and the speeds of soft-focusing movement of the units A and B are made different from each other when the amount of aberration introducible into the image format is varied.

In such a way, according to the invention, with such a simple modification of the lens configuration that two lens units constituting part of the zooming section are made axially moved in prescribed differential relation to each other, while simultaneously holding stationary the rest of the entire system, the amount of aberration, particularly spherical aberration, introducible into the image format can be controlled for obtaining a desired degree of soft-focusing effect.

Figure 1:
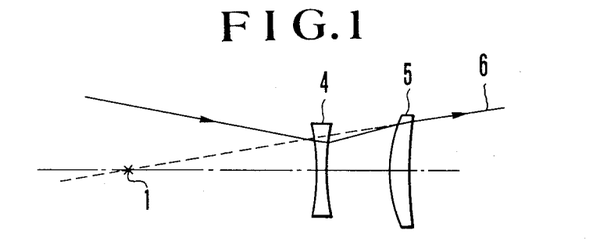
FIGS. 1 to 3 are schematic diagrams considered to explain how to produce a soft-focus effect without causing a shift of the image plane by the invention.
Figure 2:
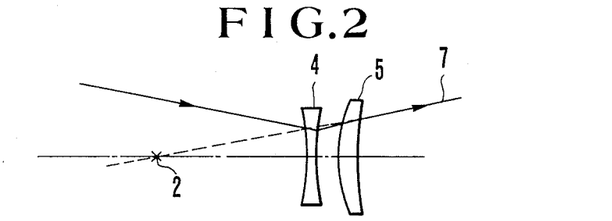
Figure 3:
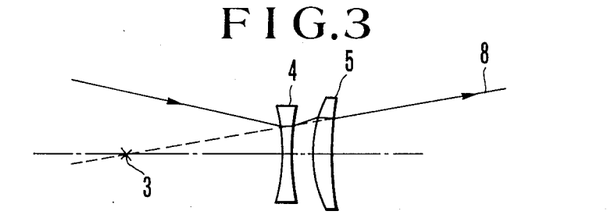

The following will describe is how it is made possible by the invention to soften the image without causing any shift of the image point by reference to FIGS. 1 to 3. In these figures, an image point for the lens units A and B generally indicated at 4 and 5 respectively change its axial position as shown by 1, 2 and 3. Though the lens unit A is shown as of negative power and the lens unit B as of positive power, this power arrangement may be reversed. For note, in the zoom lenses of FIGS. 6 to 9, the overall refractive power of the lens unts A and B is negative.

In FIG. 1, as the normal mode operates, all aberrations are well corrected for sharp definition with exclusion of any soft-focus effect. In FIG. 2, the lens unit 5 has moved from the position of FIG. 1 toward the lens unit 4. The amount of spherical aberration produced from each lens surface is proportional to the fourth power of the height of incidence on that surface. Hence, such movement causes the axial ray 7 in FIG. 2 to be incident on the lens unit 5 at a lower height than that of incidence of the axial ray 6 in FIG. 1, thereby the negative spherical aberration from the lens unit 5 is decreased. As a result, a corresponding amount of positive spherical aberration is introduced into the image format. Thus, the image is softened. On the other hand, the image point 2 for the lens unit 5 has changed its position as was moved from the position 1 of FIG. 1. In other words, the object point for that part of the lens system which follows the unit 5 has changed its position. Thus, a plane of sharp image is caused to shift.

In FIG. 3, while the lens unit 5 is moving toward the lens unit 4 with decreasing distances therebetween, the latter is also being moved so as to maintain the consant position of the image point 3 of the lens unit 5 in coincidence with the position of the image point 1 of FIG. 1. That is, the two lens units 4 and 5 are made to move at different speeds from each other to allow for exclusive production of spherical aberration, leaving the position of the image plane unchanged. Though the foregoing discussion has been conducted in connection with the faster speed of movement of the lens unit 5, that speed may otherwise be made slower to effect equivalent result.

The desideratum in the soft-focused image is to make that desirable feature uniform over the entire area of the image format. In terms of aberrations, the image has halo equalized from portion to portion all over its field when spherical aberration is introduced at any rate, while deterioration of aberrations other than spherical aberration is limited to very small or a minimum. To achieve this, the air separation between two concentric lens surfaces to the exit or entrance pupil must be varied. Otherwise it is impossible to introduce spherical aberration alone into the image format.

The zoom lenses have, however, generally their pupils varied in position with variation of the focal length, and further the difference between the axial ray and the principal ray passing through the center of the pupil is very large. In other words, because the point at which the axial ray intersects the principal ray has a different position for every image height, there is no possibility of finding out that concentric lens surface. Therefore, it is difficult to realize uniformity of the desired feature over the entire area of the image format.

So, in the present invention, to allow for production of the soft-focus effect, equivalent lens surfaces to the ideal concentric ones formed by specifying the rearmost lens surface R1r of the front unit A and the frontmost lens surface R2f of the rear unit B, and the variation of the air separation between the surfaces R1r and R2f with a diaphragm behind the surface R2f is specified also. Thus, good results are attained for the soft-focus effect over the entire area of the image format.

In specific embodiments of the invention, the following conditions are satisfied:

$$0.8 < \frac{RA}{RB} < 2.2 \quad (1)$$

$$\left| \frac{(NA - 1)(NB - 1)}{RA \times RB} \times x \times fT \right| < 0.035 \quad (2)$$

where RA and RB are the radii of curvature of the lens surfaces R1r and R2f respectively, NA is the refractive index of the medium on the object side of the surface R1r, NB is the refractive index of the medium on the image side of the surface R2f, x is the maximum variation of the air separation between the surfaces R1r and R2f as the amount of aberration introducible into the image format varies, and fT is the longest focal length of the entire system.

What technical significance these conditions have will next be explained by using FIGS. 4 and 5.

Figure 4:
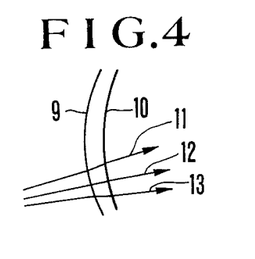
FIGS. 4 and 5 are diagrams of geometry taken to define the rules of design of the invention.
Figure 5:
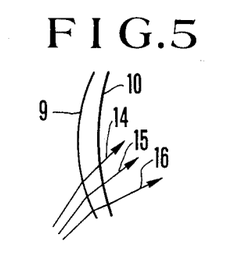
Figure 6:
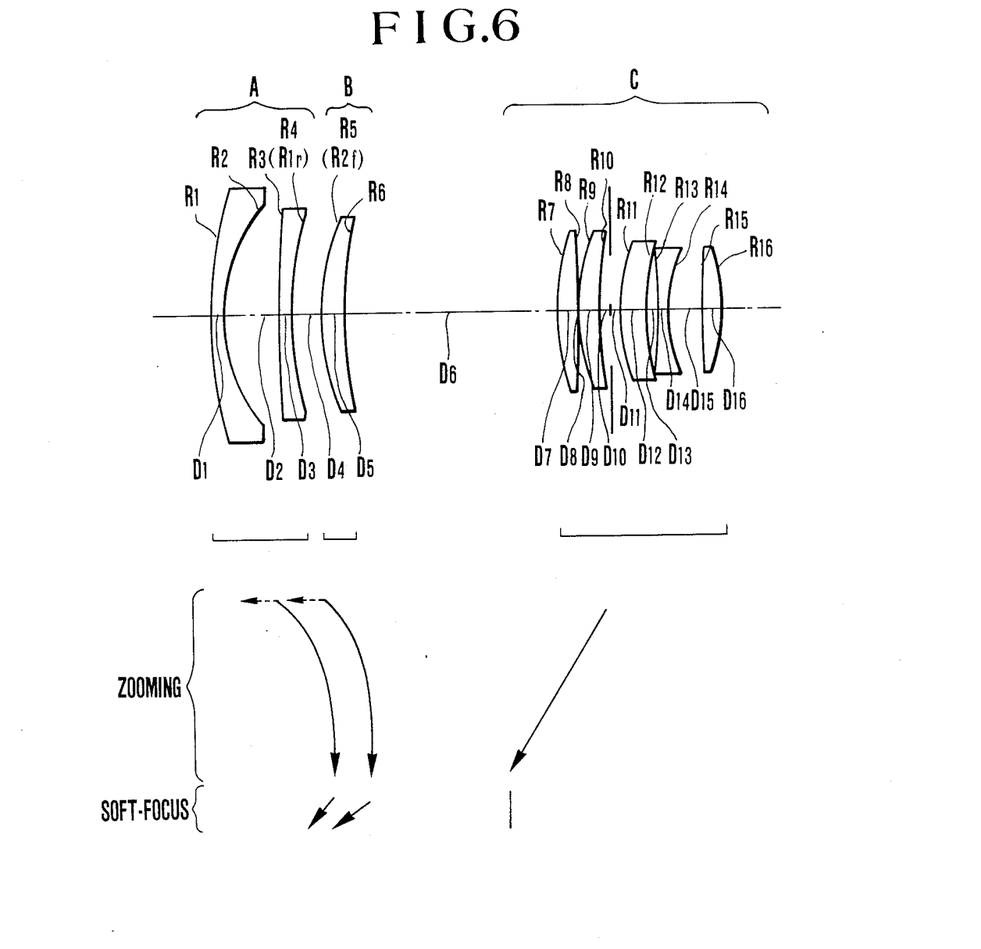
FIGS. 6 to 9 are longitudinal section views of specific embodiments 1 to 4 of zoom lenses according to the present invention.
Figure 7:
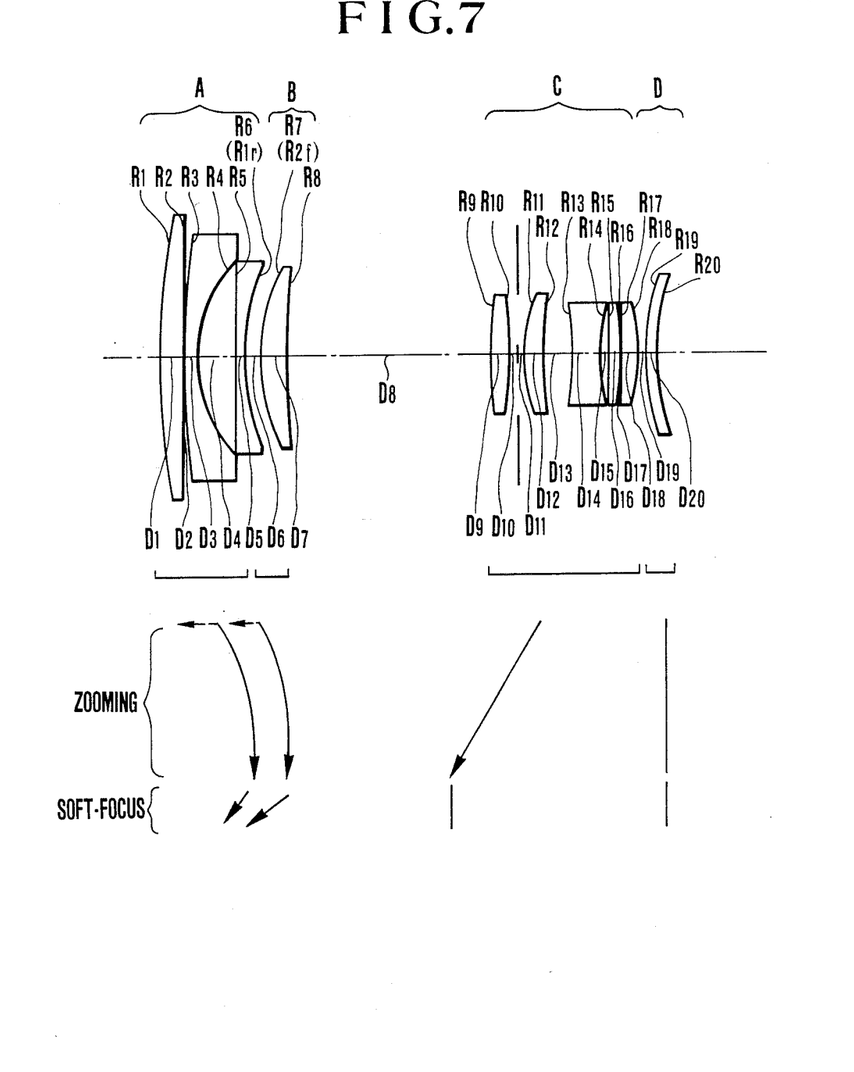
Figure 8:
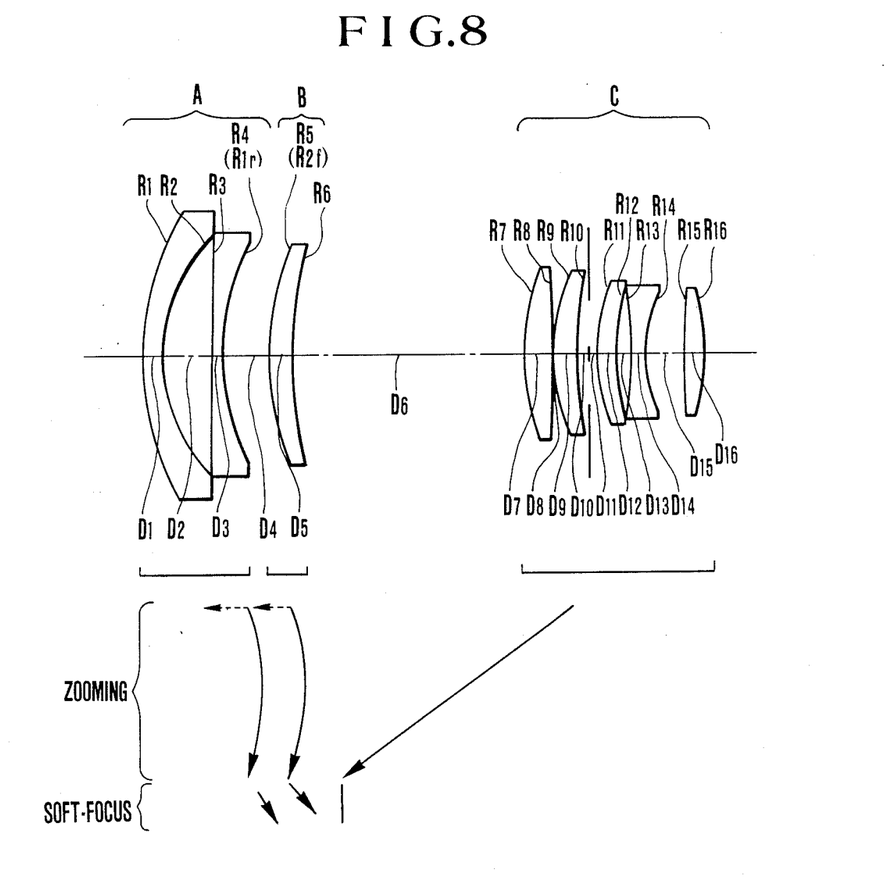
Figure 9:
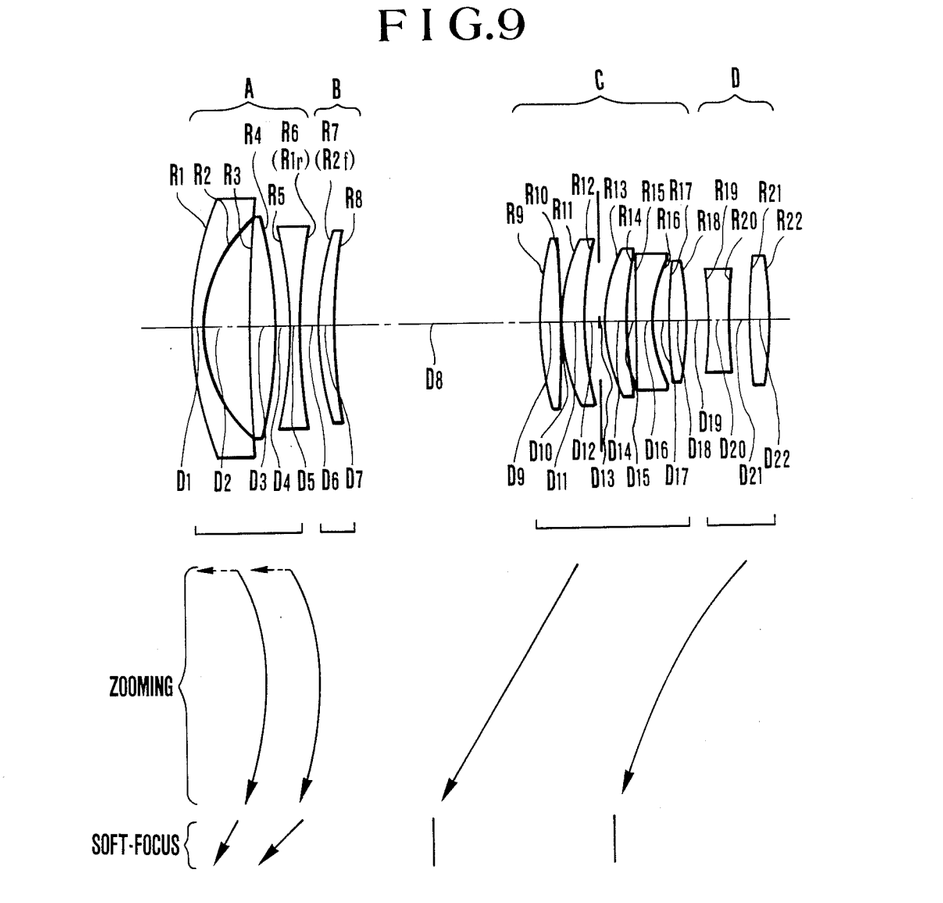
Figure 10A:
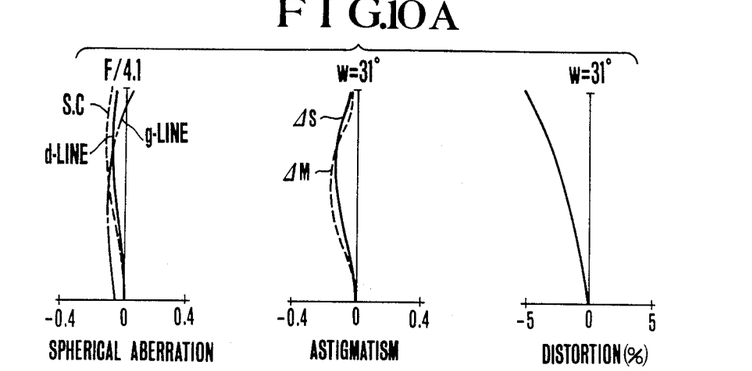
FIGS. 10A–10C, 11A–11C, 12A–12C and 13A–13C are graphic representations of the aberrations of the lenses of FIGS. 6 to 9 respectively.
Figure 10B:
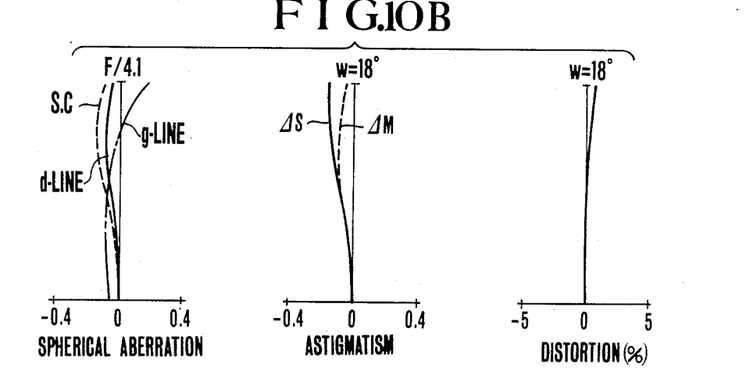
Figure 10C:
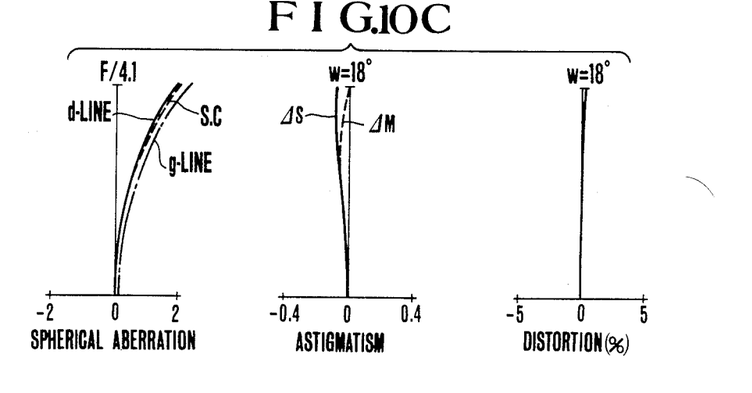
Figure 11A:
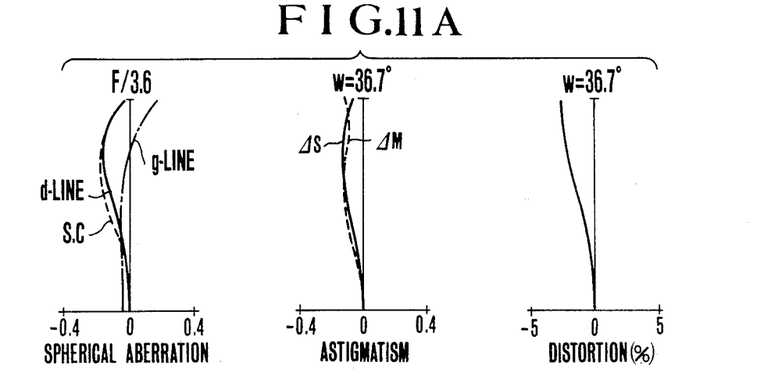
Figure 11B:
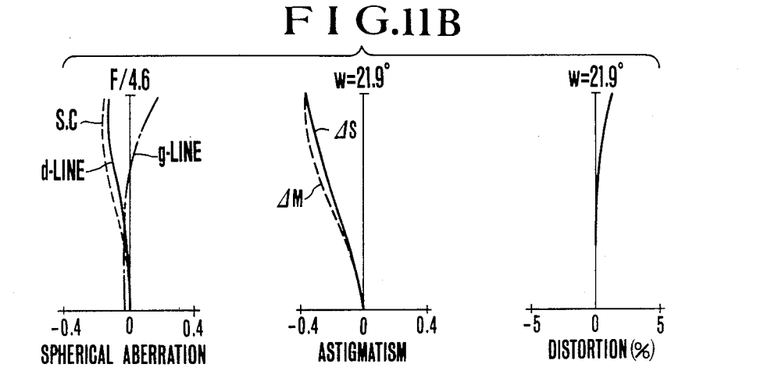
Figure 11C:
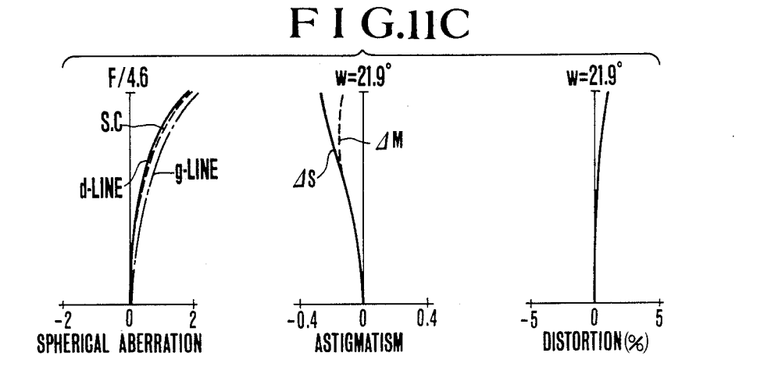
Figure 12A:
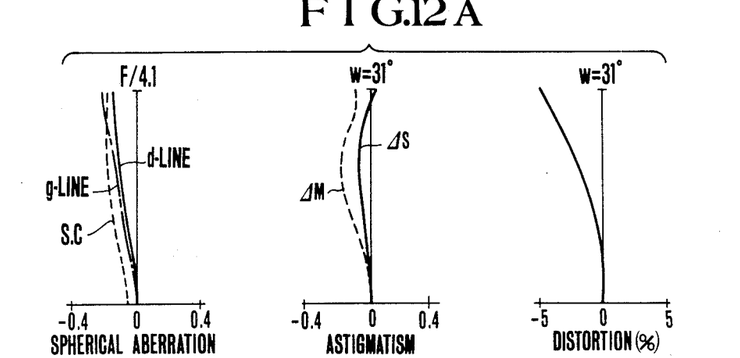
Figure 12B:
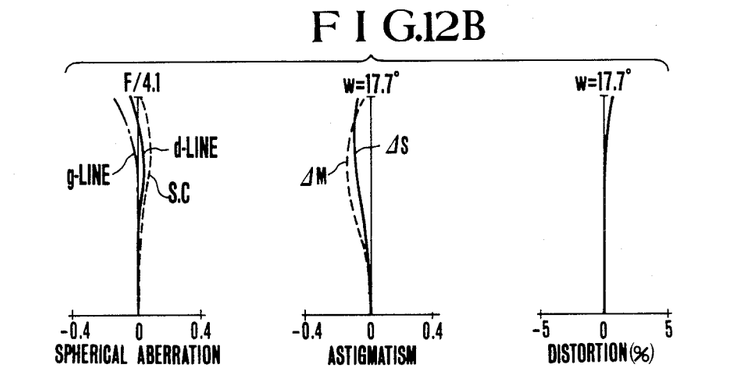
Figure 12C:
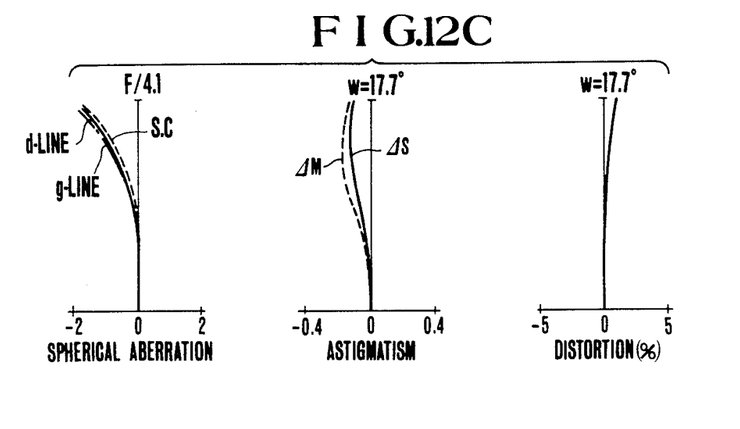
Figure 13A:
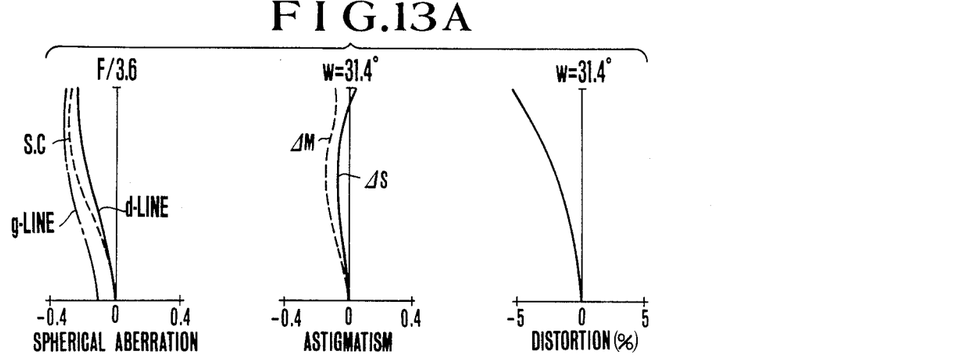
Figure 13B:
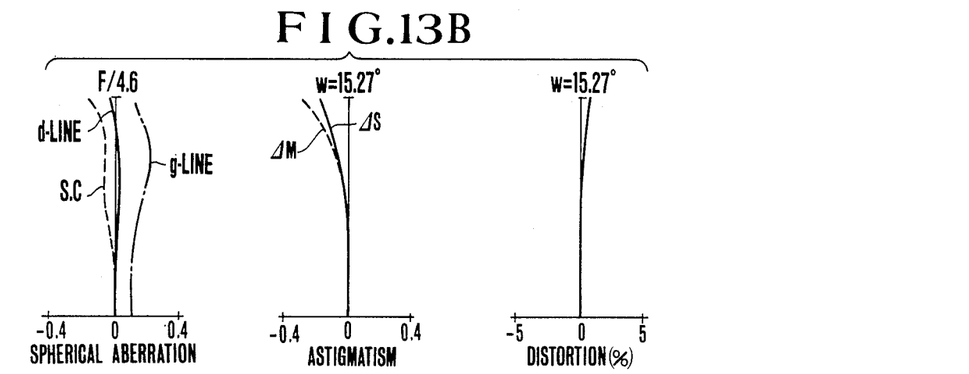
Figure 13C:
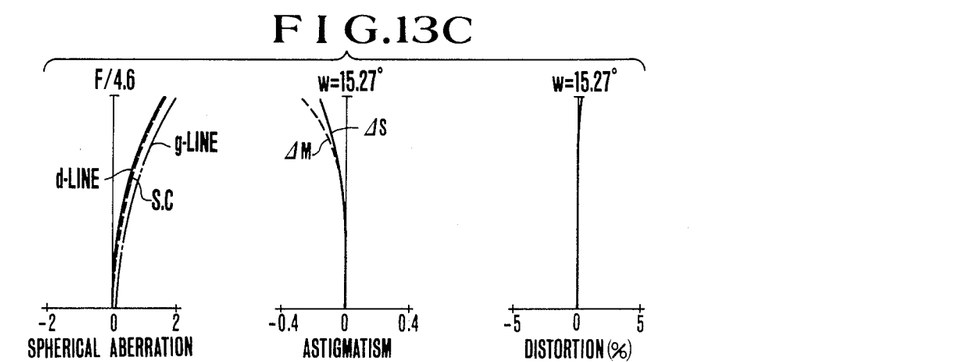

In FIGS. 4 and 5, the lens surfaces R1r and R2r are indicated at 9 and 10 respectively. Oblique pencils of rays have respective axes 12 and 15 with upper and lower marginal rays 11 and 13, and 14 and 16 respectively.

As shown in FIG. 4, the ray 12 emerging from the surface 9 is brought into almost coincidence with the incident normal of the surface 10, thereby that aberation of the oblique pencil which corresponds to spherical aberation of the paraxial pencil is prevented from varying despite the variation of the air separation between the surfaces 9 and 10. From the standpoint of good aberration correction in the nomal mode, it is preferred to set a tolerance for the angle the axis 12 makes with the incident normal in a range of $-15°$ to $+15°$. When it falls outside this range, the other various aberrations are inceased objectionably.

If, as shown in FIG. 5, the ray 15 leaving the surface 9 makes a large angle with the incident normal of the surface 10, variation of the air separation between the surfaces 9 and 10 causes the amount of aberration and the rate of variation of that aberration of those rays which are refracted by the surfaces 9 and 10 to rapidly increase, which in turn causes coma and astigmatism to vary largely. Therefore, the image quality is lowered.

That is, when the radii of curvature of the lens surfaces 9 and 10 do not lie in the range defined by the inequality of conditon (1), as has been described in connection with FIGS. 4 and 5, the possibility of increasing the proportion of the other various aberrations to the spherical aberration will be increased. This is unfavorable for the aforesaid desirable feature of the image.

The factor in the inequality of condition (2) represets the refractive power of the air lens defined by the surfaces 9 and 10. By giving a proper range for the refractive power to be suited to the range of variation of the air separation between both surfaces, all aberrations except spherical aberration are limited to a minimum. When the condition (2) is violated, large astigmatism and coma are produced, so that the image quality is greatly lowered on the peripheral portions of its field.

In application of such rules of design of the invention to zoom lenses of high range with large variation of the angular field, it is only in a fraction of the entire focal length range that the inequalities of condition (1) and (2) are satisfied. In the specific embodiments of the invention, therefore, the soft-focusing mode is made operable only near or at the telephoto end of the zooming range. But it is possible to modify the construction of such a high range zoom lens so that the above-stated conditions are satisfied throughout the entire zooming range.

Next, the numerical data in accordance with which specific zoom lenses of the invention as obtained by modifying the zoom lenses in which the high range is achieved by moving three lens units in differential relation can be constructed are listed in the following tables for the radii of curvature, R, the axial thicknesses or air separations, D, and the refractive indices, N, and Abbe numbers, $\nu$, of the glasses of the lens elements with the subscripts numbered consecutively from front to rear.

| Numerical Example 1 (FIG. 6) $f = 36.0$–$66.5$   FNO $= 4.1$ | | | |
|---|---|---|---|
| R1 = 60.68 | D1 = 1.9 | N1 = 1.69680 | $\nu$1 = 55.5 |
| R2 = 23.29 | D2 = 7.8 | | |
| R3 = 179.97 | D3 = 1.7 | N2 = 1.65844 | $\nu$2 = 50.9 |
| R4 = 47.06 | D4 = Variable | | |
| R5 = 32.39 | D5 = 3.08 | N3 = 1.75520 | $\nu$3 = 27.5 |
| R6 = 56.55 | D6 = Variable | | |
| R7 = 34.09 | D7 = 2.9 | N4 = 1.62041 | $\nu$4 = 60.3 |
| R8 = −210.82 | D8 = 0.1 | | |
| R9 = 30.66 | D9 = 3.0 | N5 = 1.60311 | $\nu$5 = 60.7 |
| R10 = 61.58 | D10 = 1.7 | | |
| Stop | D11 = 1.2 | | |
| R11 = 25.37 | D12 = 4.0 | N6 = 1.58913 | $\nu$6 = 61.0 |
| R12 = 41.90 | D13 = 1.3 | | |
| R13 = −71.91 | D14 = 1.9 | N7 = 1.80518 | $\nu$7 = 25.4 |
| R14 = 20.31 | D15 = 4.85 | | |
| R15 = 120.38 | D16 = 2.8 | N8 = 1.62588 | $\nu$8 = 35.7 |
| R16 = −29.06 | | | |
| During Zooming | D4 = 4.34 | D6 = 30.47–0.5 | |
| For Soft-Focus Setting | D4 = 3.0 | D6 = 4.435 | |

| Numerical Example 2 (FIG. 7) | | | |
|---|---|---|---|
| f = 29.0–53.8   FNO = 3.6–4.6 | | | |
| R1 = 111.08 | D1 = 3.24 | N1 = 1.65844 | $\nu1$ = 50.9 |
| R2 = 5320.68 | D2 = 0.2 | | |
| R3 = 132.92 | D3 = 1.43 | N2 = 1.80610 | $\nu2$ = 40.9 |
| R4 = 18.53 | D4 = 5.78 | | |
| R5 = 212.85 | D5 = 1.28 | N3 = 1.80400 | $\nu3$ = 46.6 |
| R6 = 35.68 | D6 = Variable | | |
| R7 = 28.29 | D7 = 3.49 | N4 = 1.80518 | $\nu4$ = 25.4 |
| R8 = 108.31 | D8 = Variable | | |
| R9 = 69.68 | D9 = 2.63 | N5 = 1.60311 | $\nu5$ = 60.7 |
| R10 = −63.73 | D10 = 1.46 | | |
| Stop | D11 = 0.5 | | |
| R11 = 18.70 | D12 = 3.07 | N6 = 1.71300 | $\nu6$ = 53.8 |
| R12 = 66.73 | D13 = 4.07 | | |
| R13 = −51.14 | D14 = 3.8 | N7 = 1.84666 | $\nu7$ = 23.9 |
| R14 = 20.34 | D15 = 1.24 | | |
| R15 = 2204.17 | D16 = 1.67 | N8 = 1.62004 | $\nu8$ = 36.3 |
| R16 = −76.95 | D17 = 0.2 | | |
| R17 = 114.31 | D18 = 2.72 | N9 = 1.62004 | $\nu9$ = 36.3 |
| R18 = −22.68 | D19 = Variable | | |
| R19 = 43.03 | D20 = 1.5 | N10 = 1.48749 | $\nu10$ = 70.1 |
| R20 = 33.37 | | | |
| During Zooming | D6 = 2.16 | | D8 = 28.85–0.26 |
| | D19 = 1.18–22.4 | | |
| For Soft-Focus Setting | D6 = 1.5 | | D8 = 2.91 |

| Numerical Example 3 (FIG. 8) | | | |
|---|---|---|---|
| f = 36.0–67.9   FNO = 4.1 | | | |
| R1 = 40.58 | D1 = 2.6 | N1 = 1.69350 | $\nu1$ = 53.2 |
| R2 = 23.33 | D2 = 6.9 | | |
| R3 = −412.23 | D3 = 1.7 | N2 = 1.66672 | $\nu2$ = 48.2 |
| R4 = 34.33 | D4 = Variable | | |
| R5 = 34.49 | D5 = 3.6 | N3 = 1.75520 | $\nu3$ = 27.5 |
| R6 = 67.31 | D6 = Variable | | |
| R7 = 34.69 | D7 = 4.1 | N4 = 1.62299 | $\nu4$ = 58.5 |
| R8 = 191.85 | D8 = 0.1 | | |
| R9 = 28.69 | D9 = 3.3 | N5 = 1.60311 | $\nu5$ = 60.7 |
| R10 = 63.67 | D10 = 1.7 | | |
| Stop | D11 = 1.2 | | |
| R11 = 26.48 | D12 = 3.1 | N6 = 1.56384 | $\nu6$ = 60.7 |
| R12 = 43.06 | D13 = 1.5 | | |
| R13 = −116.37 | D14 = 2.3 | N7 = 1.80518 | $\nu7$ = 25.4 |
| R14 = 19.60 | D15 = 5.6 | | |
| R15 = 107.49 | D16 = 2.9 | N8 = 1.62004 | $\nu8$ = 36.3 |
| R16 = −34.11 | | | |
| During Zooming | D4 = 6.28 | | D6 = 33.0–2.2 |
| For Soft-Focus Setting | D4 = 6.82 | | D6 = 0.5 |

| Numerical Example 4 (FIG. 9) | | | |
|---|---|---|---|
| f = 35.57–55.31–79.26 | | | |
| R1 = 54.33 | D1 = 1.92 | N1 = 1.80400 | $\nu1$ = 46.6 |
| R2 = 22.51 | D2 = 6.15 | | |
| R3 = 357.45 | D3 = 3.35 | N2 = 1.63636 | $\nu2$ = 35.4 |
| R4 = −70.03 | D4 = 2.43 | | |
| R5 = −61.72 | D5 = 1.40 | N3 = 1.80400 | $\nu3$ = 46.6 |
| R6 = 85.32 | D6 = Variable | | |
| R7 = 39.18 | D7 = 2.55 | N4 = 1.80518 | $\nu4$ = 25.4 |
| R8 = 75.54 | D8 = Variable | | |
| R9 = 42.18 | D9 = 3.00 | N5 = 1.69680 | $\nu5$ = 55.5 |
| R10 = −239.15 | D10 = 0.13 | | |
| R11 = 26.90 | D11 = 3.37 | N6 = 1.77250 | $\nu6$ = 49.6 |
| R12 = 51.84 | D12 = 2.15 | | |
| Stop | D13 = 1.00 | | |
| R13 = 25.67 | D14 = 2.78 | N7 = 1.65160 | $\nu7$ = 58.6 |
| R14 = 50.42 | D15 = 1.29 | | |
| R15 = 475.33 | D16 = 2.16 | N8 = 1.84666 | $\nu8$ = 23.9 |
| R16 = 17.28 | D17 = 2.64 | | |
| R17 = 94.05 | D18 = 2.53 | N9 = 1.72342 | $\nu9$ = 38.0 |
| R18 = −45.24 | D19 = Variable | | |
| R19 = −77.25 | D20 = 3.22 | N10 = 1.80610 | $\nu10$ = 40.9 |
| R20 = 76.70 | D21 = 2.99 | | |

-continued

| Numerical Example 4 (FIG. 9) | | | |
|---|---|---|---|
| f = 35.57–55.31–79.26 | | | |
| R21 = 72.39 | D22 = 2.89 | N11 = 1.66680 | $\nu11$ = 33.0 |
| R22 = −92.35 | | | |
| During Zooming | D6 = 2.486–2.611–2.986 | | |
| | D8 = 29.279–11.654–0.779 | | |
| | D19 = 3.072–3.634–10.710 | | |
| | Back Focus = 38.59–54.04–62.95 | | |
| For Soft-Focus Setting | D6 = 2.4863 | D8 = 2.0267 | |

In Example 1 (FIG. 6), R1–R4 define a lens unit A, R5–R6 another lens unit B, and R7–R16 a third lens unit C, constituting a 3-unit zoom lens. When in normal photography, as zooming goes on, the first two units A and B axially move as a unit, while the other unit C is simultaneously moved axially with variation of the air spacing between the units B and C. When in soft-focus photography, the operator will first set the zoom lens in the telephoto position and then move the first two units A and B forward in such a differential relation that the separation D4 varies from 4.34 to 3.0 mm, and the separation D6 from 0.5 to 4.435 mm, thereby the degree of soft-focusing effect is continuously increased. Focusing of this zoom lens is performed by axially moving the first two units A and B in unison.

In Example 2 (FIG. 7), there is shown a 4-unit zoom lens with R1–R6 defining a lens unit A, R7–R8 another lens unit B, R9–R18 a third lens unit C and R19–R20 a fourth lens unit D. In normal photography, during zooming, the first two units A and B axially move at the same speed, and the third unit C also moves axially, while the last unit D remain stationary, in differential relation to the units A and B. Then, in carrying out the soft-focusing operation from the telephoto end, while the last two units C and D are held stationary, the first two units A and B are axially moved in differential relation such that the separation D6 decreases from 2.16 to 1.5 mm and the separation D8 increases from 0.26 to 2.91 mm, thereby the degree of soft-focusing effect is continuously increased.

In Example 3 (FIG. 8), there is shown an almost similar 3-unit zoom lens to that of Example 1, but different from the latter in that the separation D4 conversely increases from 6.28 to 6.82 mm, and the separation D6 also conversely decreases from 2.2 to 0.5 mm when the amount of aberration introducible into the image format is continuously increased.

In Example 4 (FIG. 9), a first lens unit A from R1 to R6, a second lens unit B between R7 and R8, a third lens unit C from R9 to R8, and a fourth lens unit D from R19 to R22 in a 4-unit zoom lens are all moved in differential relation to effect zooming. Soft-focusing is carried out in the telephoto position with the last two lens units C and D held stationary.

In the embodiments of the invention, focusing by moving the first two units A and B in unison is better from the standpoint of good stability of aberrations, but it is best to move these units A and B at different speeds or to impart a so-called floating movement, during focusing. It is also possible to use the third or fourth lens unit in focusing.

Though the invention has been described as applied to the zoom lenses of the type in which three lens units are movable for zooming, it is to be understood that the invention is applicable as well to 2-unit zoom lenses in which the two units are moved in differential relation to effect zooming.

Still another type of zoom lens to which the present invention is applicable is either to hold one of the first two units A and B stationary during zooming, or to hold stationary both of the units A and B and instead make movable another unit which is otherwise stationary during zooming.

Next, how to construct a mechanism for selectively operating the zooming and soft-focusing modes of any one of the above-described zoom lenses by using a common actuator is described by reference to FIGS. 14 and 15.

To first describe the outline of such mechanism, a zoom ring 36 is drivingly connected to rotate two sleeves 21 and 22 at a time, the first sleeve 21 having two camming slots 30b and 31b for the 1st and 2nd lens units 30a and 31a respectively, and the second sleeve 22 having a camming slot 32b for the third lens unit 32a, and a distance adjusting ring 41 is drivingly connected to axially move the first sleeve 21. The first and second sleeves 21 and 22 are axially movable relative to each other but are restrained from rotation about an optical axis relative to each other. The camming slots 30b, 31b and 32b for the zooming range are extended from at least one ends thereof to such directions that the prescribed difference between the speeds of movement of the first two units 30a and 31a over the soft-focusing range is formed, and the third lens unit 32a remains axially stationary during soft-focusing.

Figure 14:
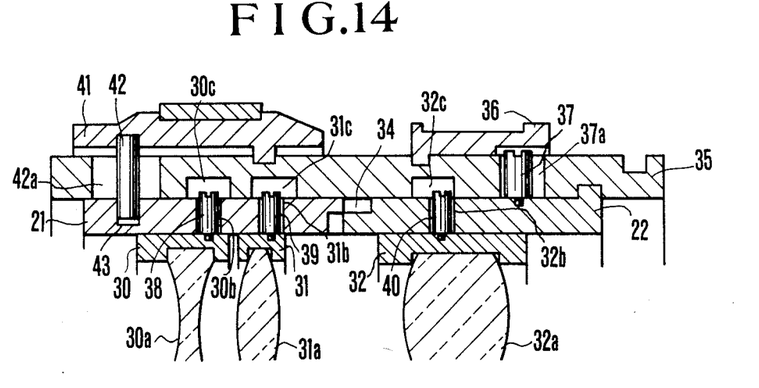
FIG. 14 is a longitudinal section view of an operating mechanism for the lens of the invention.

In more detail, a mechanical mounting for the zoom lens of FIG. 14 includes a body tube 35 in which the two cam sleeves 21 and 22 are movably fitted. Lens cells 30 and 31 containing the first and second lens units 30a and 31a respecrively are movably fitted in the inner diameter of the first sleeve 21, an a lens cell 32 containing the third lens unit 32a is movably fitted in the second sleeve 22. Pins 38, 39 and 40 radially extend from the cells 30, 31 and 32 respectively, passes through the respective camming slots 30b, 31b and 32b, and project into longitudinally elongated grooves 30c, 31c and 32c in the inner surface of the body tube 35. The rear end of the first sleeve 21 and the front end of the second sleeve 22 are drivingly connected to each other by key means 34 so that they rotate as a unit, but are axially movable independently of each other.

AA drive connection pin 37 is planded on the cam sleeve 22 and extends through a guide slot 37a in the body tube 35 about the optical axis to engage with the zoom ring 36.

Another drive connection pin 42 extends radially inwardly of the distance adjusting ring 41 through a longitudinally elongated slot 42a in the body tube 35 into a circumferential groove 43 in the outer surface of the first cam sleeve 21. Axial movement of the ring 42 is transmitted through the pin 42 to axially move the units 30a and 31a as a unit to effect focusing.

When the zoom ring 36 turns, the second cam sleeve 22 is turned by the pin 37 and at the same time the first cam sleeve 21 is turned by the key connection 34, thereby the lens cells 30, 31 and 32 are driven to move along the respective camming slots 30b, 31b and 32b. Thus, zooming is carried out. It is to be noted here that the camming slots 30b and 31b for the first and second units 30a and 31a may otherwise be formed to such shapes as to move them in differential relation during zooming. The entire zooming range is operated by using those regions of the camming slots which are bracketed by dashed lines 27 and 28 in FIG. 154. Beyond these lines 27 and 28 are extended the camming slots 30b, 31b and 32b as shown in FIG. 15. Of these extended portions of these slots, those bracketed by the line 27 and another dashed line 26 are formed to such shapes that, for soft-focus photography, the first and second lens units 30a and 31a axially move at different speeds from each other in response to rotation of the zoom ring 36, while the third lens unit 32a is held stationary. For note, in this instance, the first and second lens units 30a and 31a have negative and positive refractive powers respectively, and their overall refractive power is negative, while the third lens unit 32a has a positive refractive power. These units constitute a so-called 3-unit type zoom lens. From the opposite ends of zooming movement of these lens units there are also extended portions between the line 28 and another dashed line 29 which are assigned to another desirable feature introducible into the image format as different from the above-described one. In such a way, this example of the operating mechanism is provided with control means for selectively introducing two different desirable features into an image format. For example, by imparting into the first and second lens units 30a and 31a differential movement to each other and to the third lens unit, soft-focusing as the desirable special feature introducible into the image format is realized. Closeup photography is an example of the other desirable special feature. Even in this case, as the two lens units can be moved in varying relation, the aberration correction can be stabilized over the extended focusing range.

Many variations can be made. For example, only one capability of soft-focus photography is provided to the zoom lens. To this end, there is only need to extend the camming slots from either one of the ends, while the extended portions are inclined to each other.

Another example of variation is that one extended portion of the third camming slot 32b is perpendicular to the optical axis as in the above, but the opposite extended portion is inclined thereto so that closeup photography or supertelephoto photography can be made. That is, the three lens units are moved in extraordinary relation compared with the ordinary zooming.

On the other hand, when the distance adjusting ring 41 is moved straight forward or rearward, as this motion is absorbed by the key means, the first cam sleeve 21 along with the cells 30 and 31 is moved axially by the pin 42, leaving the second cam sleeve 22 behind. Thus, focusing of the zoom lens is carried out as usual.

It is to be noted that the manners in which the zoom ring 36 and the distance adjusting ring 41 are operated may be exchanged.

As has been described above, according to the present invention, only one actuator suffices not only for performing zooming operation, but also for making special photography at either end of the zooming range by moving at least two of the lens units movable for zooming in a different way from that when zooming.

What is claimed is:

1. A zoom lens, comprising:
   at least three lens units movable along the optical axis for zooming,
   said three lens units including successively arranged first and second lens units, said first lens unit having a concave lens surface facing toward the second lens unit and said second lens unit having a convex lens surface facing toward the first lens unit, and said first and second lens units being arranged to move at different speeds along the optical axis for a soft-focus photography.

2. A zoom lens according to claim 15 wherein the rearmost lens surface of the front one of said first and second lens units and the frontmost lens surface of the rear one of said first and second lens units are both made formed to convex shapes toward the front, and these lens units move axially at different speeds from each other, said zoom lens satisfying the following conditions:

$$0.8 < \frac{RA}{RB} < 2.2$$

$$\left| \frac{(NA - 1)(NB - 1)}{RA \times RB} \times x \times fT \right| < 0.035$$

where RA is the radius of curvature of said rearmost lens surface, NA is the refractive index of the medium of the lens element having that surface RA, RB is the radius of curvature of said frontmost lens surface, NB is the refractive index of the medium of the lens element having that surface RB, x is the maximum variation of the air separation between said rearmost and said frontmost lens surfaces as it varies with variation of aberration, and fT is the longest focal length of the entire system.

3. A zoom lens according to claim 15, wherein the rearmost lens surface of the front one of said first and second lens units and the frontmost lens surface of the rear one of said first and second lens units are both made formed to convex shapes toward the front, and these lens units move axially at different speeds from each other and wherein said front lens unit has a negative refractive power, and said rear lens unit that follows it has a positive refractive power, whereby the overall refractive power of said both units is made negative, and the refractive power of the unit on the image side of said rear unit is made positive.

4. A zoom lens accordeing to claim 1, wherein said first lens unit is arranged on the most frontside of the zoom lens.

5. A zoom lens according to claim 1, further comprising a fourth lens unit.

6. A zoom lens comprising:
a front lens group movable for zooming; and
a rear lens group arranged on the image side of said front lens group to move at the same time with, and independently of, said front lens group to effect zooming,
wherein said front lens group includes first and second lens units arranged to move axially in differential relation when soft-focus photography is made, while said rear lens group is held stationary during the soft-focus photography.

7. A zoom lens according to claim 6, further comprising:
a lens unit arranged on the image side of said rear lens group to remain stationary during zooming.

8. A zoom lens according to claim 6, wherein said rear lens group includes a plurality of lens units arranged to move at the same time and independently of each other during zooming.

9. A zoom lens according to claim 6, wherein the rearmost lens surface of said first lens unit and the frontmost lens surface of said second lens unit both have convex forms toward the front.

10. A zoom lens comprising:
a front lens group movable for zooming; and
a rear lens group arranged on the image side of said front lens group to move at the same time with, and independently of, said front lens group to effect zooming,
wherein said front lens group includes first and second lens units arranged to move axially in differential relation when soft-focus photography is made, while said rear lens group is held stationary during the soft-focus photography said zoom lens satisfying the following conditions:

$$0.8 < \frac{RA}{RB} < 2.2$$

$$\left| \frac{(NA - 1)(NB - 1)}{RA \times RB} \times x \times fT \right| < 0.035$$

where RA is the radius of curvature of said rear most lens surface, NA is the refractive index of the medium of the lens element having that surface, RB is the radius of curvature of said frontmost lens surface, NB is th refractive index of the medium of the lens element having that surface, x it the maximum variation of the air separation between said rearmost and said frontmost lens surface as it is made variable for varying the amount of aberration introducible into the image format, and fT is the longest focal length of the entire system.

11. A zoom lens comprising:
a front lens group movable for zooming; and
a rear lens group arranged on the image side of said front lens group to move at the same time with, and independently of, said front lens group to effect zooming, wherein said front lens group includes first and second lens units arranged to move axially in differential relation when soft-focus photography is made, while said rear lens group is held stationary during the soft-focus photography,
wherein said front lens group has a negative refractive power, said rear lens group has a positive refractive power, said first lens unit has a negative refractive power, and said second lens unit has a positive refractive power.

* * * * *

UNITED STATES PATENT AND TRADEMARK OFFICE
CERTIFICATE OF CORRECTION

PATENT NO. : 4,781,446

DATED : November 1, 1988

INVENTOR(S) : TSUNEFUMI TANAKA, ET AL.

It is certified that error appears in the above-identified patent and that said Letters Patent is hereby corrected as shown below:

Column 2, line 33, "change" should read --changes--;

line 61, "consant" should read --constant--.

Column 3, line 13, "Otherwise" should read --Otherwise,--;

line 54, "R2r" should read --R2f--;

line 61, "aberation" should read --aberration--;

line 63, "aberation" should read --aberration--.

Column 4, line 18, "represets" should read --represents--.

Column 6, line 34, "remain" should read --remains--;

line 52, "R9 to R8," should read --R9 to R18,--.

Figure 15:
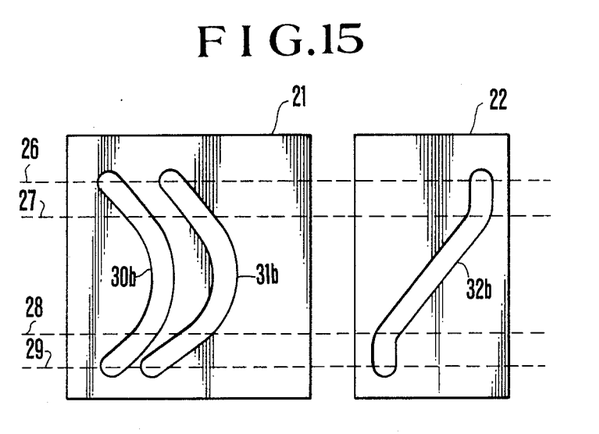
FIG. 15 is an expanded view of the cam sleeve of FIG. 14.

Column 7, line 35, "respecrively" should read --respectively--;

line 39, "passes" should read --pass--;

line 47, "AA" should read --A--; same line, "planded" should read --planted--;

line 55, "ring 42" should read --ring 41--;

Column 8, line 1, "FIG. 154" should read --FIG. 15--.

UNITED STATES PATENT AND TRADEMARK OFFICE
CERTIFICATE OF CORRECTION

PATENT NO. : 4,781,446

DATED : November 1, 1988

INVENTOR(S) : TSUNEFUMI TANAKA, ET AL.

It is certified that error appears in the above-identified patent and that said Letters Patent is hereby corrected as shown below:

Column 9, line 3, "claim 15" should read --claim 1--;

line 29, "claim 15," should read --claim 1,--;

line 42, "accordeing" should read --according--;

line 43, "most frontside" should read --frontmost side--.

Column 10, line 23, "photography" should read --photography,--;

line 32, "rear" shouls read --rear- --;

line 36, "th" should read --the--;

line 37, "it" should read --is--;

line 39, "surface" should read --surfaces--;

UNITED STATES PATENT AND TRADEMARK OFFICE
CERTIFICATE OF CORRECTION

PATENT NO.   :  4,781,446
DATED        :  November 1, 1988
INVENTOR(S)  :  TSUNEFUMI TANAKA, ET AL.

It is certified that error appears in the above-identified patent and that said Letters Patent is hereby corrected as shown below:

Column 10, line 48, "zooming, wherein" should read --zooming, wherein--;

line 53, "wherein" should read --whereby--.

Signed and Sealed this

Eighteenth Day of April, 1989

Attest:

DONALD J. QUIGG

Attesting Officer

Commissioner of Patents and Trademarks